(No Model.)
C. J. LOWE.
SAW.
No. 305,206. Patented Sept. 16, 1884.
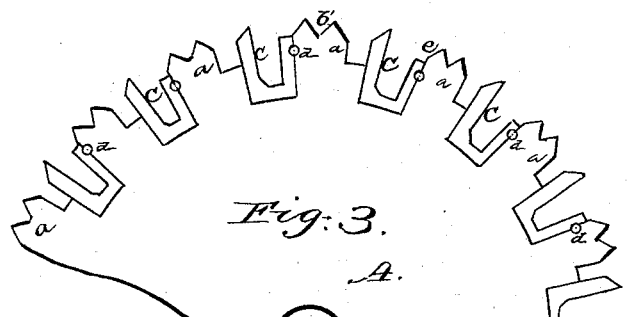
Fig. 3.
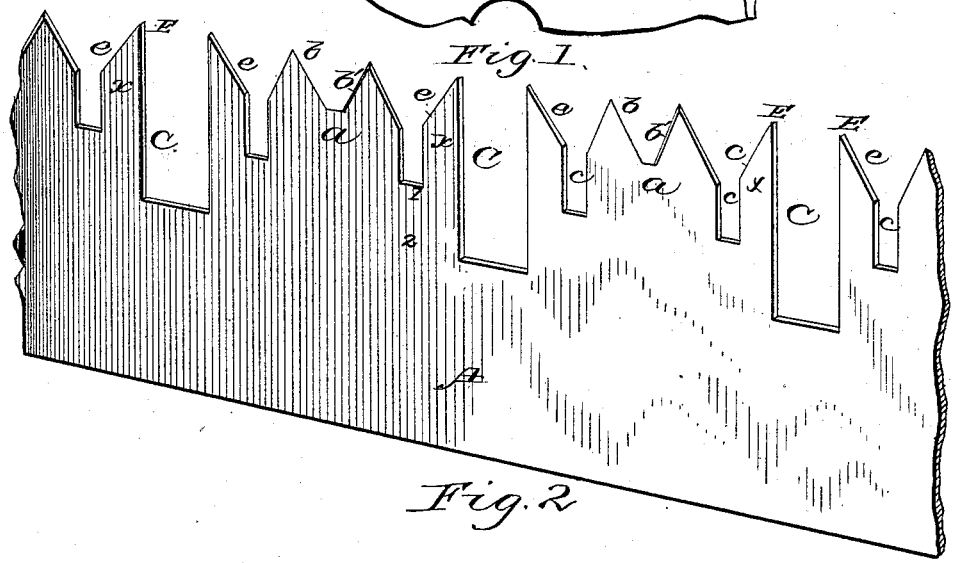
Fig. 1.
Fig. 2.
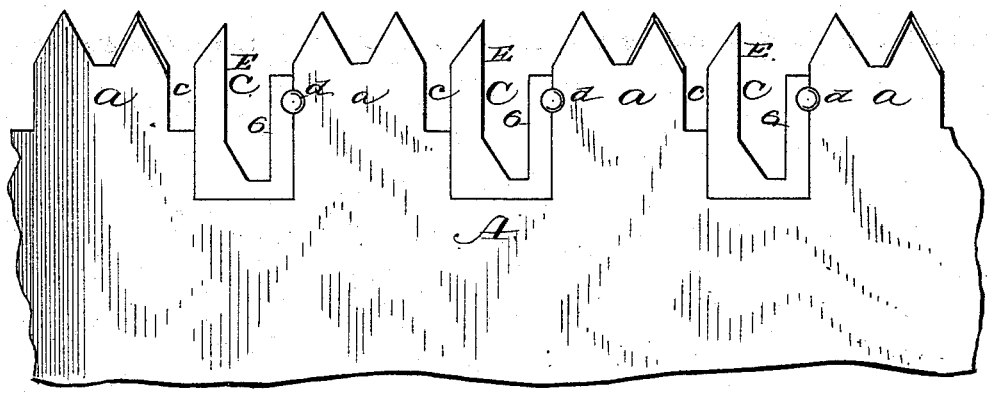
WITNESSES:
J. W. Reynolds
Edward E. Ellis
INVENTOR
Charles J. Lowe
BY
ATTORNEY

UNITED STATES PATENT OFFICE.

CHARLES J. LOWE, OF CHERRYFIELD, MAINE.

SAW.

SPECIFICATION forming part of Letters Patent No. 305,206, dated September 16, 1884.

Application filed April 25, 1884. (No model.)

*To all whom it may concern:*

Be it known that I, CHAS. J. LOWE, of Cherryfield, in the county of Washington and State of Maine, have invented certain new and useful Improvements in Rake-Teeth for Saws; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the construction of cutting and clearing teeth of crosscut and circular saws; and it consists in such details as will be hereinafter distinctly described.

Formerly, in many instances, the space or throat of the clearing-teeth, into which the dust and minute shavings are gathered and finally discharged from, has always been to each side of the clearing-teeth and between them and the sets of cutting-teeth, and in some instances this space or throat has been made exceedingly deep and broad, in order to effect a certainty of clearing action. These constructions of teeth have proved themselves inadequate to the needs of a saw, for the reasons, first, that by having the gathering-space or throat to each side of the clearing-teeth and between them and the cutting-teeth the amount of metal necessary to be gummed out weakens the support or bearing of both the cutting and clearing teeth, and causes them, when operated, to shiver or tremble, thus tending to the production of an unevenness in the kerf; and, secondly, the teeth gradually become weakened, and finally render the saw partially, if not entirely, unfit for use. I propose to overcome the above objections in the following manner, and with reference to the accompanying drawings, in which—

Figure 1 represents a perspective view of a portion of a crosscut-saw embodying my improvements; and Fig. 2, a side view enlarged of a portion of a circular saw in which the clearing-teeth are, in accordance therewith, slightly modified. Fig. 3 is a side view of a similar saw, in which its correct contour is shown.

The saw A is formed with sets of cutting-teeth $a$, each set comprised by two points sharpened on alternately-opposite edges, as shown at $b\ b'$. Adjacent to each side of the sets of cutting-teeth $a$ are the non-clearing edges $e$ of the clearing-teeth E, which teeth E in shape conform to a vertical half of a cutting-tooth. This edge of the clearing-teeth is flat, and is separated from each contiguous set of cutting-teeth $a$ by a space, $c$, which allows said teeth $a$ to take a deeper hold into or penetration of the wood at each stroke. Furthermore, by having this edge flat and unsharpened, it is, in consequence of the teeth $a$ being sharpened, wider than the cutting-edge of said teeth, and thus does it serve to guide and steady the teeth at each stroke.

Formerly the edges of the clearing-teeth described herein as the non-clearing edges have been made to serve as the clearing-edges, and, in consequence, the gathering-spaces, which are ordinarily required to be deep, are brought where the spaces $c$ are herein shown. In my case I form the gathering-spaces C between each pair of clearing-teeth, and thus gain between each set of said teeth and the teeth $a$ the additional strength afforded by the amount of material of which the saw is made left between the points marked 1 and 2, Fig. 1. The clearing-edges of the teeth E are straight and flat, as shown, which causes them to effectually cleanse the kerf. In a right-hand stroke of the saw the teeth marked $x$ serve to cleanse the kerf of the dust and shavings produced by the set of cutting-teeth preceding it, and on the return-stroke the opposite clearing-teeth operate in like manner.

In Fig. 2 is represented an enlarged view of a portion of circular saw, and in Fig. 3 a single clearing-tooth only is employed between each set of cutting-teeth, as the direction of movement of the saw is always the same. By virtue of this I am enabled to reenforce each set of cutting-teeth by the addition of the portion denoted at 6. In this instance I have formed the clearing-teeth removable from the blade, and they are formed on their outer edges with grooves, which fit down over knife-edges formed on the corresponding edges of the blade into which they fit. They are firmly maintained in the blade by countersunk rivets $d$, and thus prevented from loosening.

I am aware that it is not new, broadly, to provide a saw with "clearing-teeth" having between them the "gathering-spaces," and also aware that clearing-teeth have heretofore been provided with straight and flat clearing-edges; but as heretofore constructed the depth of the spaces dividing the cutting-teeth from the clearing-teeth has either been equal to or in excess of the gathering-spaces, thus having a tendency to cause the saw to tremble in operation, and, finally, in a very short time rendering it unfit for use. I overcome these objections by having the spaces which separate the cutting-teeth from the "clearers" of a less depth than the gathering-spaces, thereby gaining the strength afforded by the amount of material thus retained between them.

Having thus described my invention, what I claim is—

A saw having sets of cutting-teeth $a$ sharpened on alternately-opposite edges, and having clearing-teeth conforming in contour to the vertical half of a cutting-tooth, their clearing-edges being straight and flat and divided by the gathering-spaces C, said clearing-teeth being separated from the cutting-teeth by spaces $c$, whose depth is less than the gathering-spaces, all substantially as shown, and for the purpose set forth.

In testimony that I claim the foregoing as my own I affix my signature in presence of two witnesses.

CHARLES J. LOWE.

Witnesses:
O. E. DUFFY,
M. P. CALLAN.